T. W. CAPEN.
SHAFT SUSPENSION.
APPLICATION FILED SEPT. 11, 1913.
1,184,417.
Patented May 23, 1916.
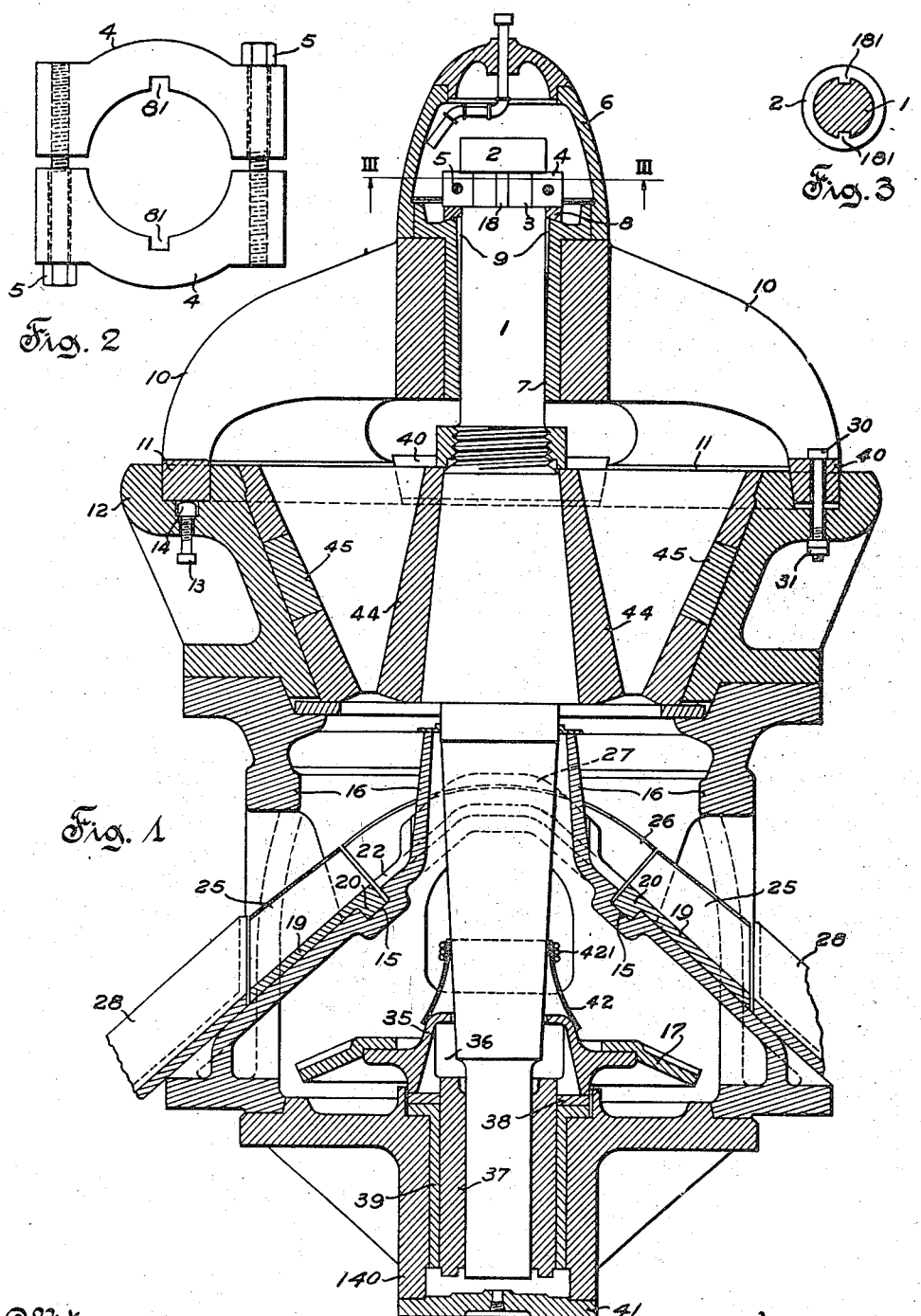

UNITED STATES PATENT OFFICE.

THOMAS W. CAPEN, OF BENTON HARBOR, MICHIGAN, ASSIGNOR, BY MESNE ASSIGNMENTS, TO ALLIS-CHALMERS MANUFACTURING COMPANY, A CORPORATION OF DELAWARE.

SHAFT SUSPENSION.

1,184,417.  Specification of Letters Patent.  Patented May 23, 1916.

Original application filed May 3, 1909, Serial No. 493,636. Divided and this application filed September 11, 1913. Serial No. 789,385.

*To all whom it may concern:*

Be it known that I, THOMAS W. CAPEN, a citizen of the United States, residing at Benton Harbor, in the county of Berrien and State of Michigan, have invented a certain new and useful Improvement in Shaft Suspensions, of which the following is a specification.

This invention relates to improvements in the construction of shaft suspensions and is particularly applicable to such improvements as applied to the shaft suspensions of gyratory crushers.

An object of the invention is to provide a shaft suspension which is simple in construction and efficient in operation.

Another object is to provide a shaft suspension which is especially applicable to the shafts of very large and massive crushers, or other devices wherein the suspension elements are subjected to high pressures.

This application is a division of application Serial No. 493,636, filed May 3, 1909.

The device disclosed in the present application is an improvement in the shaft suspension disclosed in Patent No. 867,557, Oct. 1, 1907.

A clear conception of one embodiment of the invention may be had by referring to the drawing accompanying and forming part of this specification in which like reference characters indicate the same or similar parts in the various views.

Figure 1 is a central vertical section through a gyratory crusher with the improved shaft suspension applied thereto. Fig. 2 is an enlarged plan view of the shaft suspension collar. Fig. 3 is a sectional view of the shaft, the section being taken on the line III—III of Fig. 1 looking in the direction of the arrow.

The gyratory crusher consists essentially of a main shaft 1 carrying the head 44, the shaft 1 being suspended from the crusher spider 10. The spider 10 is rigidly connected to the top shell 12, the interior of which is lined with concaves 45. The top shell 12 rests upon the bottom shell 16 to which is fastened a bottom plate 140. The lower bearing of the main shaft 1 is formed in the bottom plate 140, the bottom plate 140 and cover 41 forming an oil chamber about said bearing.

The main shaft 1 is suspended from the spider 10 by means of a rigid suspension collar 4, see Figs. 1 and 2. This collar 4 is fitted into a groove 3 which is formed in the main shaft 1 adjacent its upper end 2. The keys or feathers 18 coact in slots 81 of the collar 4 and in adjacent keyways 181 formed in the shaft at the groove 3, and serve to prevent the collar 4 from turning about the shaft. The two halves of the collar 4 are clamped together by means of bolts 5, see Figs. 1 and 2, thereby positively locking the key in place in the slots 81 and grooves 181.

A wearing ring 8 having a spherical zone surface on its lower side, coacts with a corresponding convex upper surface of the spider bushing 1 on its lower side, and with a lower surface of the collar 4 on its upper plane surface. The spider bushing 7 which is supported in the spider 10 has a tapered bore 9 through which the main shaft 1 passes. A suitable dust cap 6 is provided over the working parts just described, and rests on the top of the spider 10.

The spider 10 may have any number of arms desired, and as disclosed, there are four arms, two being shown. The arc-shaped bases 11 of the spider 10 are slightly tapered convergingly on their inner surfaces and coact in a correspondingly shaped groove in the upper portion of the top shell 12. The bases 11 are also tapered convergingly upwardly at their ends. The groove is concentric with the crusher, the portion of the groove which is not filled by the spider bases 11 being filled by the spider wedge-blocks 40. These wedge-blocks 40 are tapered convergingly downward on their inner and end surfaces and are of sufficient length to form a wedge between the two bases 11. Bolts 30 are used for securing the spider 10 and wedge-blocks 40 to the top shell 12, these bolts 30 being locked into place by the lock nuts 31. A series of standard or stock bolts 13, not specially machined and carrying the nuts 14, are passed through cored holes in the top shell 12 below the bases 11 and the wedge-blocks 40, and serve as jack-screws. The cored holes through the top shell 12 have square recesses to accommodate the nuts 14.

The bottom shell 16 forms a support for a number of liners 19, 22, and for the discharge spouts 28. The liners 19 which lie adjacent the spouts 28 have transverse ridges 20 upon their lower sides, which co-act in recesses 15 cast in the upper surface of the bottom shell 16. The outer liners 19 have side walls 25. The upper liners 22 are formed so as to make an arch connection between the two sets of liners 19, and are laterally curved to provide a recess for the shaft 1. Some of the liners 22 are provided with side walls 26, 27.

The bottom shell 16 also forms a covering for the driving gear 17 and the gear hub 35 to which the gear 17 is secured. This gear hub 35 is formed in one piece with, or may be rigidly connected to, the eccentric 37 through the eccentric bore of which the shaft 1 passes as usual. The upper hollow portion of the gear hub 35 is conical in shape and extends nearly up to the shaft 1, thus forming the oil chamber 36. A strip of fabric 42 is fastened to the shaft 1 in any convenient manner, as by tying with cords 421. The bushing 39 is fastened to the bottom plate 40 and forms a support for a wearing plate 38 on which the gear hub 35 bears.

During the normal operation of the crusher, the main shaft 1 is gyrated in the usual manner by means of a pinion which meshes with the driving gear 17. The material to be crushed is fed upon the concave 45 and is crushed by the action of the head 44 which has a gyratory motion by the rotation of the eccentric 37. Upon leaving the crushing chamber the crushed material falls upon the sectional lining from which it is discharged through the discharge spouts 28. The sectional lining, due to its special construction, is easily removable, which is a great advantage in case it is desired to make repairs.

The supporting collar 4 at the top of the shaft 1 forms a rigid supporting means as well as one which can be easily removed in case repairs are found necessary. The positive locking of the keys 18 in place in the groove 3 of the shaft 1, is an improvement in the construction disclosed in my prior patent above referred to in which the key is held in place only by the friction and is not positively locked in place as in the present device. The formation of the shaft 1 with a single continuous groove 3 near its upper end moreover permits rigid securing of the collar 4 to the shaft.

It should be understood that it is not desired to be limited to the exact details of construction shown and described, for obvious modifications will occur to a person skilled in the art.

It is claimed and desired to secure by Letters Patent,—

1. In combination, a shaft, formed with a continuous annular groove and with a recess at said groove and within the limits thereof, a collar extending into said groove and formed with a recess and positively locked against end displacement by the side faces of said groove and by the end faces of said shaft recess, a key lying in said recesses, and means for holding said collar within said groove.

2. In combination, a shaft formed with a continuous annular groove and with at least two recesses at and within the limits of said groove, a plural part collar extending into said groove each part being formed with a recess to lie opposite one of said recesses of said shaft, a key lying in each two opposed recesses, said keys being positively locked against end displacement by the side faces of said groove and by the end faces of said shaft recesses, and means for holding said collar within said groove.

3. In combination, a shaft formed with a continuous annular groove having a recess therein, a collar extending into said groove and formed with a recess to lie opposite said shaft recess, a key lying in said recesses and positively locked against end displacement by the side faces of said groove and by the end faces of said shaft recess, and means for clamping said collar to said shaft.

In testimony whereof, the signature of the inventor is affixed hereto in the presence of two witnesses.

THOMAS W. CAPEN.

Witnesses:
 WILLIAM E. MARSH,
 J. W. CULLININE.

It is hereby certified that in Letters Patent No. 1,184,417, granted May 23, 1916, upon the application of Thomas W. Capen, of Benton Harbor, Michigan, for an improvement in "Shaft Suspensions," errors appear in the printed specification requiring correction as follows: Page 2, lines 70-71, claim 1, strike out the words and comma "a key lying in said recesses,"; same page and claim, line 67, after the word "recess" insert a comma and the words , *a key lying in said recesses;* and that the said Letters Patent should be read with these corrections therein that the same may conform to the record of the case in the Patent Office.

Signed and sealed this 20th day of June, A. D., 1916.

[SEAL.]

J. T. NEWTON,
*Acting Commissioner of Patents.*

Cl. 64—25.